United States Patent [19]

Oyama et al.

[11] Patent Number: 4,656,219
[45] Date of Patent: Apr. 7, 1987

[54] RUBBER MEMBER HAVING OIL RESISTANCE AND RESISTANCE TO DETERIORATION

[75] Inventors: Motofumi Oyama, Yokosuka; Toshiharu Honda, Kamakura; Yoichiro Kubo, Yokohama, all of Japan

[73] Assignee: Nippon Zeon Co., Ltd., Tokyo, Japan

[21] Appl. No.: 802,084

[22] Filed: Nov. 27, 1985

Related U.S. Application Data

[63] Continuation of Ser. No. 638,543, Aug. 7, 1984, abandoned, which is a continuation of Ser. No. 479,730, Mar. 28, 1983, abandoned.

[30] Foreign Application Priority Data

Mar. 27, 1982 [JP] Japan .................. 57-49521

[51] Int. Cl.$^4$ ........................... C08K 5/01
[52] U.S. Cl. ......................... 524/481; 524/483; 525/328.9; 525/329.2; 525/329.3; 525/338; 525/339; 526/329.1; 526/338
[58] Field of Search ............ 525/338, 339, 328.9, 525/329.2, 329.3; 526/329.1, 338; 524/481, 483

[56] References Cited

U.S. PATENT DOCUMENTS

| | | | |
|---|---|---|---|
| 2,457,873 | 1/1949 | D'Alelio | 525/329.3 |
| 2,482,073 | 9/1949 | Stanton et al. | 525/329.3 |
| 2,643,247 | 6/1953 | Fisher et al. | 526/329.1 |
| 3,118,854 | 1/1964 | Hess, Jr. et al. | 526/338 |
| 3,493,550 | 2/1970 | Schmitt et al. | 525/329.3 |
| 3,538,194 | 11/1970 | Barrett et al. | 526/329.1 |
| 3,753,959 | 8/1973 | Ichikawa et al. | 526/329.1 |
| 3,766,300 | 10/1973 | De La Mare | 525/338 |
| 3,846,389 | 11/1974 | Furukawa et al. | 526/338 |
| 3,873,494 | 3/1975 | Lewis | 525/221 |
| 3,887,651 | 6/1975 | Inomata et al. | 526/329.1 |
| 3,963,665 | 6/1976 | Boyer | 524/308 |
| 4,096,135 | 6/1978 | Ohishi et al. | 525/343 |
| 4,259,460 | 3/1981 | Schwarz | 525/239 |
| 4,337,329 | 6/1982 | Kubo et al. | |
| 4,350,796 | 9/1982 | Oyama et al. | |
| 4,384,081 | 5/1983 | Kubo et al. | |
| 4,404,329 | 9/1983 | Maeda et al. | 525/329.2 |
| 4,421,884 | 12/1983 | Oyama et al. | 525/315 |

Primary Examiner—Joseph L. Schofer
Assistant Examiner—Bernard Lipman
Attorney, Agent, or Firm—Sherman and Shalloway

[57] ABSTRACT

A rubber article with excellent oil resistance and aging resistance to be used in contact with a polyolefin oil or a lubricating oil containing a polyolefin oil, at least the surface of the rubber article being contacted with said oil, said rubber article being composed substantially of a vulcanized product of a copolymer rubber comprising (1) 10 to 60% by weight of units derived from an unsaturated nitrile, (2) 0 to 30% by weight of units derived from a conjugated diene, and (3) 90 to 10% by weight of units derived from an ethylenically unsaturated monomer other than the unsaturated nitrile and/or units resulting from the hydrogenation of units derived from a conjugated diene.

9 Claims, No Drawings

RUBBER MEMBER HAVING OIL RESISTANCE AND RESISTANCE TO DETERIORATION

This application is a continuation of application Ser. No. 638,543, filed Aug. 7, 1984, now abandoned, which is a continuation of application Ser. No. 479,730, filed Mar. 28, 1983, now abandoned.

This invention relates to rubber articles having excellent oil resistance and aging resistance which is suitable for use in contact with polyolefin oils or lubricating oils containing polyolefin oils.

In recent years, as a result of extending the maintenace period of automobiles, it has been desired to improve the durability of automobile parts. A study has been made to prolong the life of engine oils, and some of conventional mineral oils as lubricating oils have come to be replaced with polyolefin engine oils having an excellent heat stability (J. of the Society of Automotive Engineers of Japan, Vol. 35, No. 8, pp. 928-933, 1981). Meanwhile, an acrylonitrile-butadiene copolymer rubber (hereinafter abbreviated at times to "NBR") has been so far widely used in automobile parts for engine oils such as hoses, gaskets, O-rings, oil seals, etc. as a synthetic rubber having an excellent oil resistance. However, since rubber members composed mainly of NBR are heavily deteriorated to become hard when contacting polyolefin oils or lubricating oils containing polyolefin oils and cannot endure the long-term use, it has been demanded to develop novel rubber members.

It is an object of this invention to provide a rubber article which can withstand long-term use even under the aforesaid circumstances.

According to this invention, as a rubber article to meet the above object, there is provided a rubber article at least the surface of which is contacted with a polyolefin oil or a lubricating oil containing a polyolefin oil, said rubber article being composed substantially of a vulcanized product of a copolymer rubber comprising (1) 10 to 60% by weight of units derived from an unsaturated nitrile, (2) 0 to 30% by weight of units derived from a conjugated diene, and (3) 90 to 10% by weight of units derived from an ethylenically unsaturated monomer other than the unsaturated nitrile and/or units resulting from the hydrogenation of units derived from a conjugated diene.

The rubber articles of this invention can be used under severer conditions for a longer period of time than a conventional rubber article composed mainly of a vulcanized NBR when it is used in contact with polyolefin oils or lubricating oils containing polyolefin oils.

The polyolefin oils or lubricating oils containing polyolefin oils which the rubber articles of this invention contact are ones widely used in the fields of jet engine oils, automobile engine oils, aircraft oils, electrical insulation oils, refrigerator oils, low-temperature grease base oils, and so forth.

In this invention, the polyolefin oils are not limited in particular and generally those obtained by using at least one of olefins having 4 to 20 carbon atoms as a main starting material. For example, they are liquid polymers made of butene, 1-hexene, 1-octene, 1-decene, 1-dodecene, and the like. The lubricating oils containing the polyolefin oils are those containing as base oils polyolefin oils alone or mixtures of polyolefin oils and polyol esters, diesters, alkyl benzenes, mineral oils, etc.

In this invention, the rubber article at least the surface of which is contacted with the polyolefin oil or the lubricating oil containing the polyolefin oil is composed of the above-specified copolymer rubber.

The copolymer rubber making up the rubber article of this invention is a copolymer rubber comprising (1) units derived from an unsaturated nitrile, (2) units derived from a conjugated diene, and (3) units derived from the ethylenically unsaturated monomer other than the unsaturated nitrile and/or units resulting from the hydrogenation of units derived from a conjugated diene. The amount of the units from the unsaturated nitrile in the rubber is 10 to 60% by weight, preferably 20 to 50% by weight. When it is less than 10% by weight, the resulting rubber has poor oil resistance. When it exceeds 60% by weight, the cold resistance of the rubber becomes worse. The amount of the units from the conjugated diene in the rubber is 0 to 30% by weight, preferably 0 to 20% by weight, most preferably 0 to 10% by weight. When it exceeds 30% by weight, the resulting rubber has poor resistance to deterioration by polyolefin oils. The amount of the units from the ethylenically unsaturated monomer other than the unsaturated nitrile and/or the units resulting from the hydrogenation of the units from the conjugated diene in the rubber is 90 to 10% by weight, preferably 80 to 35% by weight, most preferably 80 to 40% by weight. When it is less than 10% by weight, the resulting rubber is liable to the deterioration by polyolefin oils.

The copolymer rubber used in this invention is a rubber obtained by partially hydrogenating the conjugated diene units of a copolymer rubber composed of an unsaturated nitrile and a conjugated diene; a copolymer rubber composed of an unsaturated nitrile, a conjugated diene and an ethylenically unsaturated monomer copolymerizable therewith; and a rubber obtained by partially hydrogenating the conjugated diene units of a copolymer rubber composed of an unsaturated nitrile, a conjugated diene and an ethylenically unsaturated monomer.

Suitable monomers used in the production of the copolymer rubber of this invention include unsaturated nitriles such as acrylonitrile and methacrylonitrile; conjugated dienes such as butadiene, isoprene and 1,3-pentadiene; unsaturated carboxylic acids such as acrylic acid, methacrylic acid, itaconic acid and maleic acid; alkyl esters of the aforesaid carboxylic acids, such as methyl acrylate, 2-ethylhexyl acrylate and octyl acrylate; alkoxyalkyl acrylates such as methoxyethyl acrylate, ethoxyethyl acrylate and methoxyethoxyethyl acrylate; and ethylenically unsaturated monomers such as allyl glycidyl ether, vinyl chloroacetate, ethylene, butene-1 and isobutylene.

Specific examples of the copolymer rubber of this invention are hydrogenation products of butadiene-acrylonitrile copolymer rubber, isoprene-acrylonitrile copolymer rubber and butadiene-isoprene-acrylonitrile copolymer rubber; butadiene-methyl acrylate-acrylonitrile copolymer rubber and a hydrogenation product thereof; butadiene-acrylic acid-acrylonitrile copolymer rubber and a hydrogenation product thereof; and butadiene-ethylene-acrylonitrile copolymer rubber and a hydrogenation product thereof. These copolymer rubbers can be used either alone or with another rubber, if required, without departing from the spirit and scope of this invention.

The rubber article of this invention is produced by kneading the aforesaid copolymer rubber of this invention and conventional compounding ingredients including a filler, a reinforcing agent, a vulcanizing agent, a plasticizer, an antioxidant or other compounding additives ordinarily used to form a rubber stock, molding it into a desired shape such as a sheet, a hose, a tube, a belt, etc. directly or by inserting a fiber-reinforced layer in the middle using conventional molding machine, and the shaped article is then subjected to vulcanization such as press vulcanization, etc. Vulcanizing systems used to produce the rubber articles of this invention may be a sulfur-vulcanizing system, an organic peroxide-curing system, etc. generally employed in the rubber industry and are not limited in particular. Specific examples of the rubber article of this invention are sealing members such as gaskets, O-rings, etc. and conveying members such as hoses, belts, etc. These examples are not limitative, and the present invention encompasses all rubber articles used in contact with polyolefin oils or lubricating oils containing polyolefin oils.

The following examples illustrate the present invention in detail.

EXAMPLES 1 TO 4 AND COMPARATIVE EXAMPLES 1 TO 3

One hundreds parts by weight of each of seven copolymer rubbers mentioned as below were mixed on a 6-inch roll mill with 5 parts by weight of zinc oxide, 1 part by weight of stearic acid, 40 parts by weight of FEF carbon black, 0.5 part by weight of sulfur, 2 parts by weight of tetramethylthiuram disulfide, 0.5 part by weight of mercaptobenzothiazol, 1 part by weight of octylated diphenylamine and 1 part by weight of N-phenyl-N'-isopropyl-p-phenylenediamine to form a rubber stock. The rubber stock was press-vulcanized at 160° C. for 20 minutes to form a sheet 2 mm thick.

The type and composition each of the rubbers used in examples and comparative examples are as follows.

| Example 1: Partially hydrogenated acrylonitrile-butadiene copolymer rubber | |
|---|---|
| Acrylonitrile unit | 37% by weight |
| Hydrogenated butadiene unit | 44.1% by weight |
| Butadiene unit | 18.9% by weight |
| Example 2: Butadiene-butyl acrylate-acrylonitrile copolymer rubber | |
| Butadiene unit | 5% by weight |
| Butyl acrylate unit | 60% by weight |
| Acrylonitrile unit | 35% by weight |
| Example 3: Partially hydrogenated acrylonitrile-butadiene copolymer rubber | |
| Acrylonitrile unit | 37% by weight |
| Hydrogenated butadiene unit | 56.7% by weight |
| Butadiene unit | 6.3% by weight |
| Example 4: Partially hydrogenated acrylonitrile-butadiene copolymer rubber | |
| Acrylonitrile unit | 45% by weight |
| Hydrogenated butadiene unit | 49.5% by weight |
| Butadiene unit | 5.5% by weight |
| Comparative Example 1: Acrylonitrile-butadiene copolymer rubber | |
| Bonded acrylonitrile (NIPOL 1043: a product of Nippon Zeon Co., Ltd.) | 33% by weight |
| Comparative Example 2: Partially hydrogenated acrylonitrile-butadiene copolymer rubber | |
| Acrylonitrile unit | 37% by weight |
| Hydrogenated butadiene unit | 28.4% by weight |
| Butadiene unit | 34.6% by weight |
| Comparative Example 3: Butadiene-butyl acrylate-acrylonitrile copolymer rubber | |
| Butadiene unit | 35% by weight |
| Butyl acrylate unit | 30% by weight |
| Acrylonitrile unit | 35% by weight |

Each of the rubber sheets were tested in accordance with JIS K-6301 for the mechanical properties in the normal state, and for their oil resistance.

[Oil resistance test]

The rubber sheet was dipped in the oil heated at 150° C. for 7 days. After dipping, the mechanical properties of the rubber sheet in a swollen state was measured and shown in Table 1 as % change. And the occurrence of the cracks when the sheet in a swollen state was bent through 180° was determined. The oils used for test are JIS No. 1 Oil, PAOL 50 (a polyolefin oil produced by The Lion Fat & Oil Co., Ltd.), KYOSEKI ACE (a polyolefin lubricating oil produced by Kyodo Sekiyu K.K.) and Mobil 1 (a polyolefin lubricating oil produced by Mobil Oil). The results are shown in Table 1.

Moreover, the rubber sheets were dipped at 150° C. in each of JIS No. 1 Oil, NISSEKI PAN-S (a lubricating oil of mineral oil type produced by Nippon Oil Co., Ltd.), PAOL 40, PAOL 50 or PAOL 60 (a polyolefin oil produced by The Lion Fat & Oil Co., Ltd.), KYOSEKI ACE (a polyolefin lubricating oil produced by Kyodo Sekiyu K.K.), Mobil 1 (a polyolefin lubricating oil produced by Mobil Oil), Super G (a polyolefin lubricating oil produced by Gulf Oil), Subzero Fluid (a polyolefin lubricating oil produced by Chevron), Fire & Ice (a polyolefin lubricating oil produced by Shell Oil) or P-Z-L (a polyolefin lubricating oil produced by Pennz Oil) for 40 days at the longest. The number of days which elapsed until the sheet developed cracks when bent through 180° in a swollen state was determined. The results are indicated in Table 2.

TABLE 1

| | Examples | | | | Comparative Examples | | |
|---|---|---|---|---|---|---|---|
| | 1 | 2 | 3 | 4 | 1 | 2 | 3 |
| Vulcanizing properties | | | | | | | |
| Tensile strength (kg/cm$^2$) | 211 | 210 | 264 | 268 | 200 | 200 | 206 |
| Elongation (%) | 410 | 380 | 530 | 580 | 450 | 420 | 370 |
| Hardness (JIS · A) | 74 | 68 | 73 | 72 | 72 | 73 | 65 |
| Dipping test 150° C. × 7 days | | | | | | | |
| JIS No. 1 Oil | | | | | | | |
| % change in tensile strength | 0 | +1 | −2 | +1 | +2 | −2 | −1 |
| % change in elongation | +2 | +5 | +13 | +7 | −20 | +5 | +8 |
| Change in hardness (point) | −4 | −3 | −3 | −1 | −4 | −3 | −4 |
| Test in bending at 180° | O*1 | O | O | O | O | O | O |
| PAOL 50 (polyolefin oil) | | | | | | | |
| % change in tensile strength | −37 | −14 | −42 | 0 | −63 | −61 | −66 |
| % change in elongation | −56 | −66 | −62 | −59 | −67 | −71 | −81 |
| Change in hardness (point) | +2 | +3 | +1 | +1 | +6 | +5 | +7 |

TABLE 1-continued

|  | Examples | | | | Comparative Examples | | |
|---|---|---|---|---|---|---|---|
|  | 1 | 2 | 3 | 4 | 1 | 2 | 3 |
| Test in bending at 180° | O | O | O | O | X*2 | X | X |
| KYOSEKI ACE (polyolefin lubricating oil) | | | | | | | |
| % change in tensile strength | −27 | −49 | −47 | −39 | −65 | −59 | −61 |
| % change in elongation | −54 | −66 | −60 | −67 | −76 | −81 | −73 |
| Change in hardness (point) | +3 | +4 | +1 | +1 | +7 | +6 | +7 |
| Test in bending at 180° | O | O | O | O | X | X | X |
| Nobil 1 (polyolefin lubricating oil) | | | | | | | |
| % change in tensile strength | −41 | −37 | −41 | −33 | −79 | −64 | −71 |
| % change in elongation | −63 | −63 | −66 | −64 | −80 | −52 | −62 |
| Change in hardness (point) | −3 | −3 | −2 | −3 | −3 | −3 | −3 |
| Test in bending at 180° | O | O | O | O | X | X | X |

*[1] O indicates test crack did not occur.
*[2] X indicates that crack occurred.

TABLE 2

(Number of days which elapsed until crack occurred.)

| Dippong | | Examples | | | | Comparative Examples | | |
|---|---|---|---|---|---|---|---|---|
|  |  | 1 | 2 | 3 | 4 | 1 | 2 | 3 |
| JIS No. 1 Oil | | 35 | 35 | 35 | >40 | 10 | 10 | 10 |
| NISSEKI PAN-S | (lubricating oil of mineral oil type) | 40 | 40 | >40 | >40 | 35 | 35 | 35 |
| PAOL 40 | (polyolefin oils) | >40 | >40 | >40 | >40 | 5 | 7 | 5 |
| PAOL 50 | | >40 | >40 | >40 | >40 | 5 | 5 | 5 |
| PAOL 60 | | >40 | >40 | >40 | >40 | 7 | 7 | 3 |
| KYOSEKI ACE | | 35 | 35 | >40 | >40 | 7 | 7 | 5 |
| Mobil 1 | (polyolefin lubricating oils) | >40 | >40 | >40 | >40 | 7 | 7 | 7 |
| Super G | | >40 | >40 | >40 | >40 | 5 | 5 | 5 |
| Subzero Fluid | | 35 | >40 | >40 | >40 | 7 | 7 | 7 |
| Fire & Ice | | >40 | >40 | >40 | >40 | 7 | 5 | 5 |
| P-Z-L | | >40 | >40 | >40 | >40 | 14 | 7 | 7 |

What we claim is:

1. A method of providing rubber articles, at least the surface of which is in contact with polyolefin oil or lubricating oil containing polyolefin oil, which can withstand long-term use in contact with said polyolefin oil or said lubricating oil, comprising forming the rubber article from a vulcanized product of a random copolymer rubber comprising
    (1) 20 to 60% by weight of units derived from an unsaturated nitrile,
    (2) 0 to 30% by weight of units derived from a conjugated diene, and
    (3) 80 to 10% by weight of
        (i) units resulting from the hydrogenation of units derived from a conjugated diene, or
        (ii) a mixture of the units (i) and units derived from an ethylenically unsaturated monomer selected from the group consisting of acrylic acid, alkyl acrylate, and alkoxyalkyl acrylate, and allowing the vulcanized product to come into contact with the polyolefin oil or lubricating oil containing polyolefin oil for an extended period of at least about 35 days.

2. The method of claim 1 wherein the random copolymer rubber comprises (1) 20 to 50% by weight of units derived from the unsaturated nitrile, (2) 0 to 20% by weight of units derived from the conjugated diene, and (3) 80 to 35% by weight of one of the units (a), (b), or (c).

3. The method of claim 1, wherein the random copolymer rubber is a hydrogenation product of a butadiene-acrylonitrile copolymer rubber, a hydrogenation product of an isoprene-acrylonitrile copolymer rubber, or a hydrogenation product of a butadiene-isoprene-acrylonitrile copolymer rubber.

4. The method of claim 1 wherein the random copolymer rubber is a butadiene-methylacrylate-acrylonitrile copolymer rubber or a butadiene-acrylic acid-acrylonitrile copolymer rubber.

5. The method of claim 1 wherein the random copolymer rubber is a hydrogenation product of a copolymer rubber selected from the group consisting of a butadiene-methacrylate-acrylonitrile copolymer rubber, and a butadiene-acrylic acid-acrylonitrile copolymer rubber.

6. The method of claim 1 wherein the random copolymer rubber is a partially hydrogenated acrylonitrile-butadiene copolymer rubber comprising about 37% by weight of acrylonitrile unit, about 44.1% by weight of hydrogenated butadiene unit and about 18.9% by weight of butadiene unit.

7. The method of claim 1 wherein the random copolymer rubber is a butadiene-butyl acrylate-acrylonitrile copolymer rubber comprising about 5% by weight butadiene unit, about 60% by weight butyl acrylate unit and about 35% by weight acrylonitrile unit.

8. The method of claim 1 wherein the random copolymer rubber is a partially hydrogenated acrylonitrile-butadiene copolymer rubber comprising about 37% by weight acrylonitrile unit, about 56.7% by weight hydrogenated butadiene unit and about 6.3% by weight butadiene unit.

9. The method of claim 1 wherein the random copolymer rubber is a partially hydrogenated acrylonitrile-butadiene copolymer rubber comprising about 45% by weight acrylonitrile unit, about 49.5% by weight hydrogenated butadiene unit and about 5.5% by weight butadiene unit.

* * * * *